United States Patent [19]

Akita et al.

[11] 4,110,740
[45] Aug. 29, 1978

[54] LIQUID LEVEL DETECTING APPARATUS

[75] Inventors: Sigeyuki Akita, Aichi; Junji Kitagawa, Okazaki, both of Japan

[73] Assignee: Nippon Soken, Inc., Nishio, Japan

[21] Appl. No.: 764,458

[22] Filed: Jan. 31, 1977

[30] Foreign Application Priority Data

Feb. 9, 1976 [JP] Japan ................................ 51-13776[U]
Feb. 13, 1976 [JP] Japan ................................ 51-16155[U]

[51] Int. Cl.² ............................................. G08B 21/00
[52] U.S. Cl. .................................. 340/620; 73/304 R; 331/65; 340/59
[58] Field of Search ............................. 340/244 C, 59; 73/304 R; 331/65

[56] References Cited

U.S. PATENT DOCUMENTS 3,254,333  5/1966  Baumoel ........................... 340/244 C
3,694,804  9/1972  Hill ................................... 340/244 C X Primary Examiner—John W. Caldwell, Sr.
Assistant Examiner—Daniel Myer
Attorney, Agent, or Firm—Cushman, Darby & Cushman

[57] ABSTRACT

A liquid level detecting apparatus for detecting the level of a conductive liquid, comprises a pair of electrodes which are either connected with or disconnected from each other depending on the liquid level, an oscillation circuit which is variable in the state of its oscillation signal in response to the variation in impedance between the pair of electrodes and applies between the pair of electrodes an AC signal in synchronism with the oscillation signal, and a switching circuit which detects the liquid level in response to the oscillation signal, whereby dissolution of ions from the electrode into the liquid is prevented.

10 Claims, 4 Drawing Figures

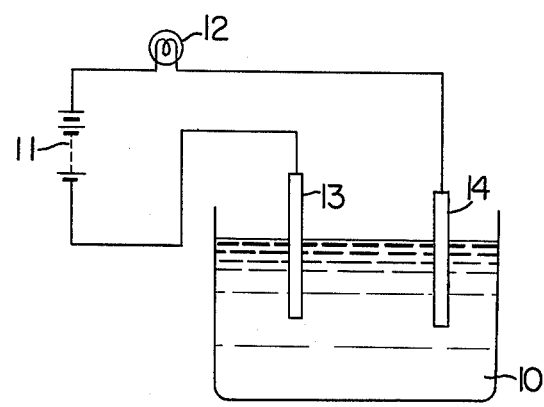
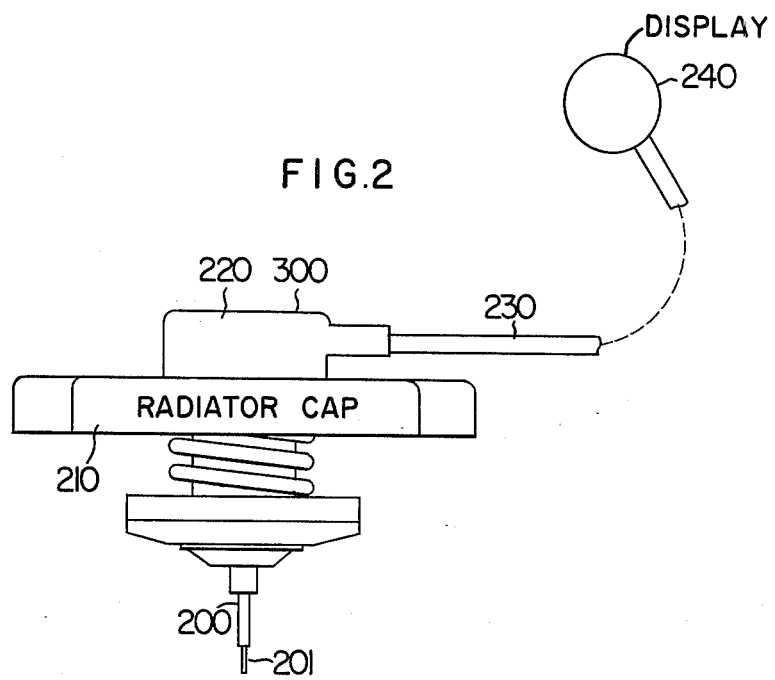

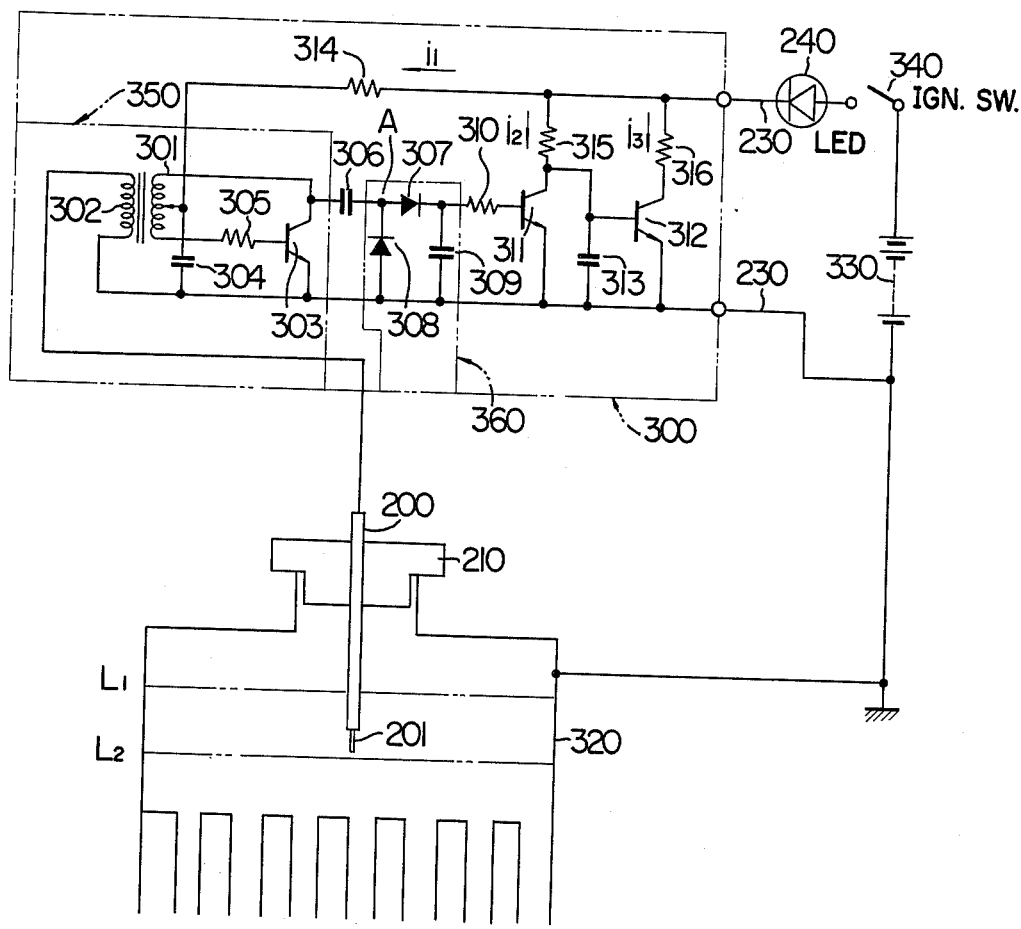
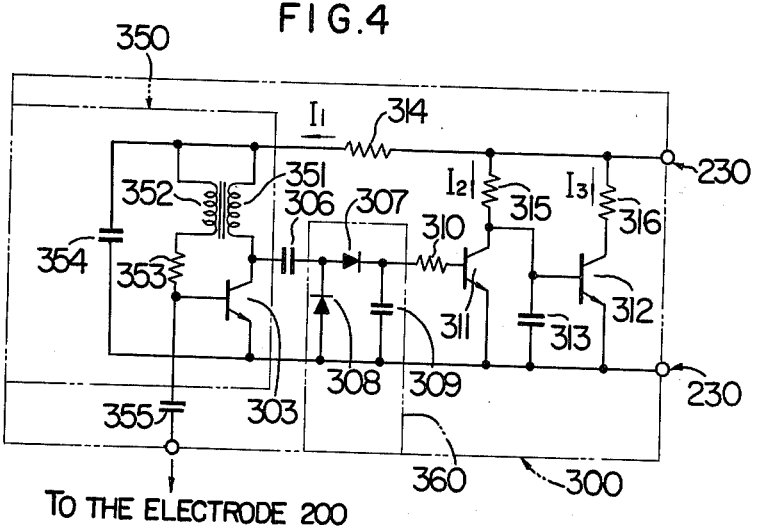

LIQUID LEVEL DETECTING APPARATUS

FIELD OF THE INVENTION

The present invention relates to a liquid level detecting apparatus for detecting the level of an electrically conductive liquid such as a radiator cooling water for an automobile.

BRIEF DESCRIPTION OF THE DRAWINGS

FIG. 1 is an electrical circuit diagram for a liquid level detecting apparatus according to the prior art, FIG. 2 is a perspective view of an embodiment of an apparatus according to the present invention, FIG. 3 is an electrical circuit diagram for an embodiment of an apparatus according to the present invention, and FIG. 4 is an electrical circuit diagram for another embodiment of an apparatus according to the present invention.

DESCRIPTION OF THE PRIOR ART

In a known apparatus for detecting the level of a liquid, as shown in FIG. 1, there are provided two electrodes 13 and 14 in an electrically conductive liquid 10. One electrode 14 is connected through a lamp 12 to the positive side of an electrical source 11, while the other electrode 13 is connected to the negative side thereof. When both the electrodes 13 and 14 are within the liquid 10, an electrical circuit is closed to turn on the lamp 12, whereas, when either one of the electrodes 13 and 14 is above the level of the liquid 10, the circuit is disconnected to turn off the lamp 12, whereby the level of the liquid 10 can be detected.

However, in such an apparatus, since a DC current flows from the positive electrode 14 to the negative electrode 13, positive ions are dissolved from the positive electrode 14 into the liquid 10, thus causing the electrode 14 to be consumed. As a result, such an apparatus has a disadvantage that it cannot be used to detect the liquid level for a long time.

SUMMARY OF THE INVENTION

An object of the present invention is to provide a liquid level detecting apparatus which has eliminated the above-mentioned disadvantage.

Another object of the present invention is to provide a liquid level detecting apparatus having a pair of electrodes between which any DC current does not flow.

Still another object of the present invention is to provide a liquid level detecting apparatus in which a pair of electrodes are connected with the secondary side of an oscillation circuit so that an AC current may flow between the electrodes.

A liquid level detecting apparatus according to the present invention comprises a pair of electrodes which are either connected through the liquid with each other or disconnected from each other depending on whether the electrodes are dipped within the liquid or not, and an oscillation circuit of which oscillation condition varies in response to the variation in the conducting state between the electrodes and which applies across the electrodes an AC signal in synchronism with an oscillation signal, whereby the electrodes are applied with only an AC signal therebetween so as to prevent ions from being dissolved from the electrodes and thus the liquid level can be reliably detected without consuming the electrodes.

In a liquid level detecting apparatus according to the present invention, there are provided a primary coil which constitutes a part of an oscillation circuit, a secondary coil which is magnetically coupled with the primary coil and a pair of electrodes which are provided on both ends of the coils, respectively, whereby the output signal of the oscillation circuit is varied in response to the variation in impedance of the secondary coil side, so that the varied output signal is detected for operating a switching circuit. Thus, the electrodes which are dipped into a conductive liquid to be measured are applied with only an AC signal, that is, are not applied with any DC signal and the liquid level can be detected without consuming the electrodes.

Further, since, in a liquid level detecting apparatus according to the present invention, the output signal is transmitted as a current value, only two lead wires are sufficient, one is the source line used also as a signal line and the other is the grounded-side line, and also some troubles of the lead wires such as breaking can be found by setting the value of the normal current at the larger value, for example.

DESCRIPTION OF THE PREFERRED EMBODIMENTS

In the following, the present invention will be described with respect to one embodiment shown in the drawings. FIG. 2 shows the entire constitution of an apparatus according to the present invention as applied to the level detection of the radiator cooling water in an automobile. Reference numeral 200 is an electrode composed of a heat-resisting wire which has a bare portion only at an end portion 201 so that, when the radiator cooling water as a liquid to be measured becomes deficient, the end portion 201 may come up from within the cooling water to be exposed to the atmosphere. Numeral 210 is a radiator cap which has the electrode 200 fixed insulatedly therefrom. Numeral 300 is an electric circuit portion including within a rubber-made cover 220 both a circuit which oscillates in response to an electrical signal from the electrode 200 and a switching circuit. Numeral 230 is a lead wire which is connected with a display portion 240 provided on a gauge board of an automobile, for example.

FIG. 3 shows an electrical circuit diagram for an embodiment of an apparatus according to the present invention; in which, an oscillation circuit 350 comprises an oscillating primary coil 301, a secondary coil 302 magnetically coupled with the primary coil 301, a transistor 303, a capacitor 304 and a resistor 305 thereby to constitute a known collector tuning oscillation circuit. The secondary coil 302 is magnetically coupled with the primary coil 301 so as to control the oscillating operation. Further, the secondary coil 302 is connected at one end through the earth with a metallic radiator main body 320 serving as one electrode while at the other end with the electrode 200 so that, when the radiator main body 320 and the electrode 200 are disconnected from each other, that is, the radiator cooling water is deficient, the oscillation circuit 350 is set to satisfy a predetermined oscillation condition thus causing a normal feedback type oscillation to be performed.

The output signal of the oscillation circuit 350 is adapted to be fed through a coupling capacitor 306 to a smoothing circuit portion 360 comprising diodes 307 and 308 and a capacitor 309, where the signal is converted into a DC signal which is fed through a resistor 310 to the base of a switching transistor 311 constituting the first stage of a switching circuit. Numeral 312 is a switching transistor constituting the second stage of the switching circuit, and numeral 313 is a capacitor. Numerals 314, 315 and 316 are resistors whose respective resistance values $R_{314}$, $R_{315}$ and $R_{316}$ are established to satisfy the relation $R_{314}, R_{315} > R_{316}$. The display portion 240 consists of a display element such as a light-emitting diode or the like. Numeral 330 is a storage battery carried by the automobile, and numeral 340 is an ignition switch of the automobile.

Next, the operation of the above-described constitution will be described. When the radiator cooling water is sufficient as shown by a level $L_1$ in FIG. 3, the end 201 of the electrode 200 is dipped within the cooling water. Since the cooling water is conductive usually having an impedance of several to several tens k Ω, both the ends of the secondary coil 302 are considered to be connected to each other with the impedance of the cooling water connected as a load therebetween. As a result, the oscillating output of the transistor 303 or an AC signal is short-circuited through the primary coil 301 on the secondary coil 302 side so that the oscillation circuit 350 does not satisfy the predetermined oscillation condition, that is, the oscillation does not take place. In this state, the transistor 303 is supplied at its base substantially with the source voltage so as to be conductive while the transistor 311 is made to be non-conductive because the electrical potential at the point A is 0 (V), as a result, the transistor 312 is conductive. Assuming the currents flowing through the resistors 314, 315 and 316 be $i_1$, $i_2$ and $i_3$, respectively, a current of $i_1 + i_3$ flows through the display portion 240 so that, in this embodiment, the light emitting diode of the display portion 240 is put on thus showing the presence of a sufficient amount of cooling water.

Next, when the cooling water is deficient as shown by a level $L_2$ in FIG. 3, the end 201 of the electrode 200 comes up from within the cooling water to be exposed to the atmosphere so that both the ends of the secondary coil 302 are disconnected from each other and the oscillation circuit 350 satisfies the predetermined oscillation condition thereby to make oscillation. This oscillation signal is smoothed through the diodes 307 and 308 and the capacitor 309 and applied to the base of the transistor 311, whereby the transistor 311 is made to be conductive while the transistor 312 to be non-conductive. In this state, a current of $i_1 + i_2$ flows through the display portion 240 and, since the current value $i_1 + i_2$ is much smaller than the current value $i_1 + i_3$, the light emitting diode of the display portion 240 is not put on thus showing the deficiency of the cooling water.

In FIG. 4, another embodiment of the electric circuit portion 300, in particular, the oscillation circuit 350, is shown. In this embodiment, an AC coupling is formed of the electrode 200 and a capacitor 355 in order to transmit an AC signal to the electrode 200. In FIG. 4, the oscillation circuit 350 comprises a primary coil 351, a secondary coil 352, a resistor 353 connected with the secondary coil 352, a transistor 303 and a capacitor 354 connected between the collector and emitter of the transistor 303 so that a feed-back type oscillation circuit is constituted. Between the base and emitter of the transistor 303 are connected the liquid level detecting electrode 200 and the metallic radiator main body 320 serving as an electrode and further a capacitor 355 for AC coupling is connected between the base of the transistor 303 and the electrode 200. Thus, a signal feedback quantity is controlled depending on the impedance variation caused by the variation in the liquid quantity between the electrodes 200 and 320 whereby the oscillation operation of the oscillation circuit 350 is controlled.

Next, the operation of the above-described constitution will be described. When the cooling water is sufficient as shown by a level $L_1$ (in FIG. 3), the end 201 of the electrode 200 is dipped within the cooling water. In this case, due to the conductivity of the cooling water, the capacitor 355 is considered to be connected at its electrode 200 side terminal with the negative side of the storage battery 330 so that the oscillation circuit 350 does not oscillate because its feedback output is by-passed to the earth. Thus, the transistor 311 is non-conductive while the transistor 312 on the next stage is conductive and, as a result, a current of $i_1 + i_3$ flows through the display portion 240 and the light emitting diode is put on showing the sufficiency of the cooling water. Further, although the end 201 of the electrode 200 and the radiator main body 320 are electrically connected through the cooling water and the oscillation signal is by-passed to the earth, only an AC signal can flow between the electrode 200 and the radiator main body 320 because the electrode 200 has the capacitor 355 connected in series therewith.

When the cooling water is deficient as shown by a level $L_2$ (in FIG. 3), the end 201 of the electrode 200 comes up from within the cooling water to be exposed to the atmosphere so that the oscillation circuit 350 performs a feedback type oscillation operation similarly to a conventional LC oscillation circuit and an oscillation signal appears at the collector of the transistor 303. As a result, the transistor 311 is made to be conductive while the transistor 312 to be non-conductive. Thus, a current of $i_1 + i_2$ flows through the display portion 240. Since the current value $i_1 + i_2$ is much smaller than the current value $i_1 + i_3$, the light emitting diode is not put on thus showing the deficiency of the cooling water.

In these embodiments, only an AC signal which is synchronized with the oscillating signal is applied between the electrode 200 and the radiator main body 320 serving as another electrode, and accordingly ions do not dissolve from the electrode 200 into the liquid to be measured, that is, the electrode 200 is not consumed.

Further, since, in these embodiments, the current is set to have a larger value $i_1 + i_3$ when the level of the cooling water is higher than the normal level and have a smaller value $i_1 + i_2$ when the level is lower than the normal level, the display portion 240 or the light emitting diode indicates deficiency also when any current does not flow because of some trouble such as breaking of the lead wire 230.

Although these embodiments are intended to detect the level of a radiator cooling water for an automobile, the present invention is not limited to these embodiments but can also be applied to any liquid level detecting apparatus for a conductive liquid.

Further, although, in these embodiments, the oscillation is adapted to be either stopped or started depending on whether the two electrodes 200 and 320 respectively connected with both the ends of the secondary coil 302 are connected through the cooling water, that is, the liquid to be measured or disconnected from each other, amplitude variation of the oscillation can be detectable, instead of the detection of either stopped or activated state of the oscillation, whereby the amplitude is detected for switching operation. Still further, the oscillation circuit 35 can be varied with respect to its oscillation frequency in dependence on the secondary coil 302 being connected or disconnected whereby the frequency is detected for switching operation.

With respect to the oscillation circuit 350, it is not limited to the collector tuning type oscillation circuit but can be an LC oscillation circuit such as a Hartley oscillator or a Colpitts oscillator or an RC oscillation circuit.

In the case that, as in these embodiments, the level of a radiator cooling water for an automobile is detected, the vessel of the liquid to be measured is groundedly connected with the negative side of the storage battery 330 carried by the automobile and so it is sufficient that the secondary coil 302 is connected at one end with the negative side and at the other end with the electrode 200 fixed at a predetermined position in the radiator main body 320. However, when the radiator main body 320 is non-conductive, the radiator cap 210 can have two electrodes fixed therein in such a manner that one electrode is disposed at a predetermined liquid level and the other is disposed at a level not higher than the former.

What is claimed is:

1. A liquid level detecting apparatus for detecting the level of a conductive liquid comprising:
    a battery;
    a pair of electrodes positioned to be electrically connected through said liquid with each other when the level of said liquid is higher than a predetermined level and electrically disconnected from each other when the level of said liquid is lower than said predetermined level;
    an oscillation circuit connected across said battery and including a primary coil and a secondary coil magnetically coupled to each other and a transistor connected to said primary coil, said secondary coil being connected to said pair of electrodes, and said oscillation circuit being adapted to produce from a collector of said transistor an oscillation signal only when said pair of electrodes are disconnected from each other;
    a coupling capacitor connected to the collector of said transistor;
    a discriminator circuit connected across said battery and to said oscillation circuit via said coupling capacitor, said discriminator circuit receiving said oscillation signal through said coupling capacitor for converting said oscillator signal into a direct current voltage signal which is higher than a lower voltage side of said battery, and
    a display means connected to said discriminator circuit for indicating whether or not the level of said liquid is higher than said predetermined level.

2. A liquid level detecting apparatus as defined in claim 1, in which said oscillation circuit comprises:
    an impedance element connected with one of said electrodes for varying the oscillation condition of said oscillation circuit in response to the variation in impedance between said electrodes.

3. A liquid level detecting apparatus as defined in claim 2, in which said discriminator circuit comprises:
    a smoothing circuit for smoothing said oscillation signal from said oscillation circuit; and
    a switching circuit operable in response to an output signal from said smoothing circuit.

4. A liquid level detecting apparatus as defined in claim 3, in which said display device is connected with said switching circuit for operating in response to operation of said switching circuit.

5. A liquid level detecting apparatus as defined in claim 1, in which said discriminator circuit comprises:
    a smoothing circuit for smoothing said oscillation signal from said oscillation circuit; and
    a switching circuit operatable in response to an output signal from said smoothing circuit.

6. A liquid level detecting apparatus as defined in claim 5, in which said display device is connected with said switching circuit for operating in response to operation of said switching circuit.

7. A liquid level detecting apparatus as defined in claim 1, wherein said discriminator circuit comprises:
    a smoothing circuit including a diode and a capacitor, said diode being connected in series with said coupling capacitor for passing a positive ocillation signal only and said capacitor being connected in series with said diode for being charged by said positive oscillation signal passed through said diode;
    a first switching circuit connected to said smoothing circuit and being adapted to operate when said smoothing circuit produces said direct current voltage signal across said capacitor thereby to have said display means inoperative; and
    a second switching circuit connected to said first switching circuit and being adapted to operate when said oscillation circuit produces no oscillation signal thereby to have said display means operative.

8. A liquid level detecting apparatus as defined in claim 1, wherein said oscillation circuit is of a collector tuned LC oscillation type.

9. A liquid level detecting apparatus as defined in claim 1, wherein said primary coil is connected in series with said transistor.

10. A liquid level detecting apparatus as defined in claim 1, wherein one of said pair of electrodes is connected to said secondary coil through a by-pass capacitor, said by-pass being also connected to said transistor for varying a signal quantity fed back to said oscillation circuit in response to the variation in impedance between said pair of electrodes thereby to control oscillation of said oscillation circuit.

* * * * *